United States Patent [19]

Ingram

[11] Patent Number: 5,740,858

[45] Date of Patent: *Apr. 21, 1998

[54] HEATING/COOLING SYSTEMS

[76] Inventor: Rex Anthony Ingram, The Old Vicarage, Shute, Axminster, Devon EX13 7PU, England

[*] Notice: The term of this patent shall not extend beyond the expiration date of Pat. No. 5,497,826.

[21] Appl. No.: 607,329

[22] Filed: Feb. 26, 1996

Related U.S. Application Data

[62] Division of Ser. No. 131,127, Oct. 4, 1993, Pat. No. 5,497,826.

[30] Foreign Application Priority Data

Oct. 5, 1992 [GB] United Kingdom ............... 9220888

[51] Int. Cl.⁶ .................................................. F24D 3/14
[52] U.S. Cl. ............................................ 165/56; 52/220.2
[58] Field of Search ............................. 165/56; 52/220.2

[56] References Cited

U.S. PATENT DOCUMENTS 3,037,746  6/1962  Williams .................................. 165/56

FOREIGN PATENT DOCUMENTS

| 0133631 | 8/1983 | European Pat. Off. |
| 3400483 | 7/1985 | Germany ............................... 165/56 |
| 1034723 | 7/1966 | United Kingdom. |
| 2063957 | 6/1981 | United Kingdom ................... 165/56 |

*Primary Examiner*—John Fox
*Attorney, Agent, or Firm*—Melvin L. Stoltz

[57] ABSTRACT

A heating/cooling system includes a plurality of solid panels which form part of a wall or floor. The panels are in the form of heating/cooling modules and incorporate a heat exchange element within the panel and in thermal contact with the material, e.g. chipboard, fiberboard or plywood, forming the panel. The panels can be provided with, for example, tongue and groove formations so that they can engage with like panels or with "industry-standard" panels which do not incorporate heat exchange elements.

3 Claims, 10 Drawing Sheets

HEATING/COOLING SYSTEMS

This application is a division of application Ser. No. 08/131,127, filed Oct. 4, 1993, now U.S. Pat. No. 5,497,826.

FIELD OF THE INVENTION

This invention relates to heating/cooling systems.

BACKGROUND TO THE INVENTION

There are a variety of different ways of heating or cooling a building. Examples include radiators, convector heaters, night storage heaters, fan heaters, electric radiant bar fires, warm air systems and air-conditioning.

Of these alternatives, the most widely used are radiator systems and storage heaters. Both of these types of heating system rely on the creation of a circulation of air within the space to be heated to transfer the heat from a local hot point—the radiator or the storage heater—to the remainder of the room, including its fittings and its occupants. This circulation of air, which is referred to as convection, is generated by air rising in front of the radiator or storage heater as it is heated. The warmed air rises to the ceiling before descending on the side of the room space opposite the radiator or heater, and then returning across the floor of the room, to be reheated.

The disadvantages of such heating systems are well-known. The greatest accumulation of heat is at ceiling level, away from the occupants, and this is wasteful. The coolest air is at or near floor level and this causes uncomfortable draughts. In order to produce the required circulation of air, the radiators or heaters have to be hot (generally between 80° and 85° C.) otherwise their efficiency falls rapidly, and at this temperature the air becomes dry, causing stuffiness and drying out both the furniture and any paintings within the room as well as the fabric of the room itself. There is also the possibility that small children or elderly people who touch the radiators or heaters can suffer burns.

The advantages of such heating systems are that they are inexpensive to install, their technology is widely understood and the necessary components are readily available.

Early electric underfloor systems, which were designed to use off-peak electricity and which treated the floor as if it was an enormous storage heater, were uncomfortable because they heated the floor to too high a temperature in the morning but yet left it too cold in the late afternoon and early evening.

More recent warm-water underfloor systems, which serve to circulate heated water through pipes which are set into the floor, or which use electric cables in the floor, to gently warm the floor, are much more successful. They warm the floor to a temperature approximately 3° to 4° C. higher than the ambient temperature required for the room space above the floor, generally to a maximum of about 25° C., so that the floor does not actually feel hot to the touch. Yet, at this temperature, the floor radiates a gentle overall warmth, with no draughts and with the highest temperatures at floor level and the lowest temperatures at ceiling level. Moreover, such systems maintain a higher relative humidity than radiator or convector heater systems, which is itself more sympathetic to the room space, its contents and its occupants.

Of more recent interest, due to the rapidly escalating cost of fuels and the increasing concern for energy conservation, is the fact that warm-water underfloor heating systems can be approximately 40 to 50% more energy efficient than radiator systems.

However, while such underfloor systems are accepted as being significantly more comfortable and more energy-efficient than alternative forms of heating, their single significant disadvantage hitherto has been that their initial installation cost has been higher than for an alternative radiator system. This factor alone has been sufficient to inhibit the much wider installation of warm-water underfloor systems, despite the running cost and energy savings which would be achieved.

Market pressures on architects, developers and builders continually demand that the cost of building construction and refurbishment is kept to a minimum, and there have been many changes in building methods in this pursuit.

one such change has led to the replacement of traditional floorboards in the construction of timber floors by mass-produced panels of particulate chip-board or fibre-board. While there are underfloor heating systems which can be fitted between the floor joists below such floor panels, and which work completely satisfactorily, they are expensive to install and consequently they are only fitted in buildings where comfort is specified as a specific and particular objective.

Another such change is the move away from solid floor constructions, in which a fine screed of 50 to 100 mm. thickness is put on top of a concrete raft or block and beam construction, towards a floor construction which includes a layer of high-density foam insulation placed directly on top of the concrete raft or the block and beam, with the insulation layer then being covered by a floating layer of particulate chipboard or fibreboard panels. The panels are produced as standard sizes, for example, 18 mm. or 22 mm. in thickness, 600 mm. in width and 2400 mm. in length. Reasons for this change include not only reduced cost but also improved sound insulation and the elimination of the "wet trades" associated with having to lay the screed.

Paradoxically, this move away from a solid, screeded floor construction method, into which known underfloor heating systems could be incorporated most efficiently, towards a type of floor construction into which it has hitherto been most difficult to incorporate underfloor heating, will potentially reduce still further the number of new underfloor heating installations and the energy savings which they would have made.

It is accordingly a specific object of the present invention to provide a method of installing an underfloor heating system which is less expensive than the installation of a convection heating system. A more general object of the invention is the provision of an improved method of installing a heating/cooling system. Thus, although it is envisaged that the majority of applications of the invention will be in relation to heating systems, the invention is equally applicable to cooling systems and to systems which can provide both heating and cooling functions.

A further object of the invention is thus the provision of an improved heating/cooling system.

It is known from European Patent Specification No. 0 006 683 (Neate) that underfloor heating systems can be made using small-diameter tubing (i.e. tubing having an internal diameter of between 5 mm. and 9 mm.) pre-fabricated on thermally conductive wire-mesh frameworks as modules, which can be interconnected within a heating/cooling system so that each is connected to a flow and return supply from a heater/cooler. Where such modules are installed in solid floor screeds, the screed can be as thin as 50 mm.

It is known from German Patent Specification No. 3217578 (Jung) that an arrangement of modular interconnected panels made, for example, from chipboard, can be used to provide a continuous serpentine channel into which large diameter piping (i.e. having an external diameter of say 15 to 22 mm.) can be laid. The serpentine channel is then covered over with a metal sheet (to aid heat distribution) and with a timber or other floor finish. This form of heating system can be installed either on timber joists or laid on top of a layer of insulation laid over a concrete structural base.

It is also known that, where a floor is formed from chipboard or fibreboard panels laid on top of a layer of insulation, which has itself been laid on a concrete structural base, a serpentine recess can be formed within the top surface of the insulation into which large diameter continuous piping (i.e. piping having an external diameter of say 15 to 22 mm.) can be laid before the chipboard or fibreboard panels are placed in position. Such an arrangement of continuous piping provides an underfloor heating system, but it is inefficient due to the poor thermal contact between the piping and the underside of the floor and due to the large amount of heat absorbed from the piping by the insulation itself.

In order to achieve the most effective heat transfer from the piping or tubing to the floor, an underfloor heating system as described above requires the piping or tubing to be surrounded with a cement-based pug or screed which is used as an inexpensive conductor. This would be used automatically when the piping or tubing is installed in the screed of a solid floor, but it is required even when systems are installed between the floor joists below a suspended timber floor. This is due to experience which has shown that air gaps around the piping or tubing can inhibit heat transfer and that timber strip floorboards and chipboard and fibreboard panels are not good conductors of heat. Without the pug, or some other form of heat transfer means such as a metal plate, it is difficult to achieve the required uniform distribution of heat through a timber floor, despite the fact that the heat has only to be conducted through the thickness of the board.

It is accordingly a further object of the present invention to provide a method of installing an underfloor heating system which can be carried out more cost-effectively than existing methods of providing underfloor heating.

It is also known from German Patent Specification No. 3717577 (Kurz) to provide a composite heating panel which includes an upper covering layer of wood to which a layer of copper wire netting is attached. The copper wire netting is bonded to a chipboard panel within which large diameter copper tubes are disposed. This panel is intended to act as a room heater but would be too expensive for incorporation in an underfloor heating/cooling system.

A still further object of the present invention is thus the provision of an improved form of panel for use as part of a heating/cooling system.

SUMMARY OF THE INVENTION

According to a first aspect of the present invention there is provided a method of installing a heating/cooling system which includes:

a) providing a plurality of solid panels, some at least of which are in the form of heating/cooling modules and incorporate a heat exchange element disposed within the body of the panel and located in thermal contact with the material forming the panel, b) joining said panels together to form a wall or floor structure, and c) interlinking the heat exchange elements of said modules.

The panels which are in the form of heating/cooling modules are preferably "standard" panels, i.e. they are of such size and configuration that they can be fitted together with other similar panels and with industry-standard panels to form a composite floor or wall. Thus the panels which are in the form of heating/cooling modules may have, along each edge, tongue and groove rebating or other means to enable them to engage with similar panels or industry-standard panels.

"Industry-standard" panels are such panels that are mass-produced industrially for use in the building industry, typically the familiar tongue and groove chipboard flooring panels which, in the United Kingdom, are of standard thicknesses of 18 or 22 mm., length 2400 mm. and width 600 mm. or 1200 mm.

The panels may be of bonded or laminated particulate material, such as chipboard, fiberboard or plywood, of sufficient hardness and rigidity to be used for the upper structural surfaces of floors or for lining walls in dwellings or other buildings. The rigidity of the panels must be sufficient to enable a panel to be laid over timber joists at standard spacings, for example, 400 mm. joist centre spacings for panels 18 mm. thick and 600 mm. joist centre spacings for panels 22 mm. thick.

The heat exchange elements may comprise tubing through which a heating or cooling fluid is passed, or electrical heating cables. The tubing is preferably plastic tubing. Preferred plastics materials are polyamides, polyethylene and polybutylene, but other materials which are able to withstand the temperature and pressure and are not affected by the heating or cooling fluid can be used.

According to another aspect of the present invention there is provided a central heating or cooling system comprising at least one source of heating or cooling fluid with flow and return pipes and heat exchange means, wherein the heat exchange means comprises at least two heat exchange elements each incorporated within a solid panel forming part of a wall or floor of cooperating panels and means for connecting the heat exchange elements to each other and to the source.

According to a further aspect of the present invention there is provided an electrical central heating system comprising a power source and heat exchange means, wherein the heat exchange means comprises at least two heat exchange elements each incorporated within a solid panel forming part of a wall or floor of cooperating panels and means for connecting the heat exchange elements to each other and to the source.

According to a still further aspect of the present invention there is provided a solid panel for use in the installation of a heating/cooling system, said panel containing a heat exchange element embedded within its structure so as to be in thermal contact with the material forming the panel, said heat exchange element having a thickness significantly less than the thickness of the panel.

The heat exchange element may be serpentine and, when reference is made to a heat exchange element being serpentine, it is meant that the heat exchange element includes at least one loop with a bend of at least 180°. The or each such panel may contain a single continuous element with a plurality of 180° bends. It is advantageous to manufacture the or each panel with rebates in one face along the line of the element and extending inwardly from the edge at which the element emerges from the panel so that the ends of the element can be drawn out from the plane of the panel for connection to the flow and return pipes or to the power supply when the panel is installed and joined to another panel.

In an alternative arrangement, the heat exchange elements each comprise a pair of end members interconnected by a plurality of parallel paths. Thus, for an electric central heating system, each heating element may comprise a plastic sheet on which an electrical resistance element is printed, said resistance element comprising a pair of relatively thick, low resistance, spaced apart end members and a large number of relatively thin, higher resistance connectors extending between the end members.

The invention further provides a method of making a panel, said method comprising providing two part-thickness panels, and joining the part-thickness panels together face-to-face with a heat exchange element sandwiched between and in thermal contact with the two part-thickness panels.

If the heat exchange element is in the form of a cable or tubing arranged in serpentine fashion, the serpentine heat exchange element will be located in a serpentine channel preformed in one or both such faces.

If the heat exchange element is in the form of tubing through which a heating or cooling fluid is passed, the tubing is preferably plastics tubing having an internal diameter of from 5 to 9 mm. and an external diameter which is not greater than 70% of the thickness of the panel. Likewise, if the heat exchange element is electric cabling, this will have an external diameter which is not greater than 70% of the thickness of the panel.

It will be apparent that a panel in accordance with the invention will have insufficient strength for use in flooring applications if the embedded heat exchange element is of such diameter as to materially weaken the panel. Likewise, the larger the bore of the tubing, the greater the volume of fluid contained within it and the greater the thermal inertia of the system. Conversely, a tube of less than the preferred diameter will contain insufficient fluid to convey the desired heating/cooling effect, unless the tube is of considerable length, in which case it imposes high frictional losses.

It has been found that, for panels having a standard thickness of 18 mm., a 7 mm. bore plastics tube is preferred while, for panels having a standard thickness of 22 mm., a bore of 7 mm. to 9 mm. is preferred. However, it is within the capacity of those skilled in the art, given the disclosure hereof, to establish the optimal tube or cable size for a given panel thickness.

The simple solid panel described herein may be incorporated in and form only part of the total thickness of a composite flooring or walling panel. For example, a panel in accordance with the invention may have either a plain chipboard top surface or a decorative top surface formed from hardwood strips or thermoplastic tiles. For industrial use, the panel may have steel decking attached to it. In a similar way, a layer of thermal and/or acoustic insulation material may be bonded to the underside of the panel to form a composite board. Likewise, a panel in accordance with the invention may be bonded to another panel of different or similar material to form a composite board which has acoustic insulation properties.

The size of panel which is most commonly used is likely to be 2,400 mm.×600 mm. but there are a variety of compatible sizes, to suit different sizes of walls and floors. Examples include 2,400 mm.×1,200 mm., 1,200 mm.×600 mm. and 600 mm.×600 mm. Similarly, although the most commonly used thicknesses are likely to be 18 mm. and 22 mm., there are a variety of other thicknesses.

DESCRIPTION OF THE PREFERRED EMBODIMENTS

Figure 1:
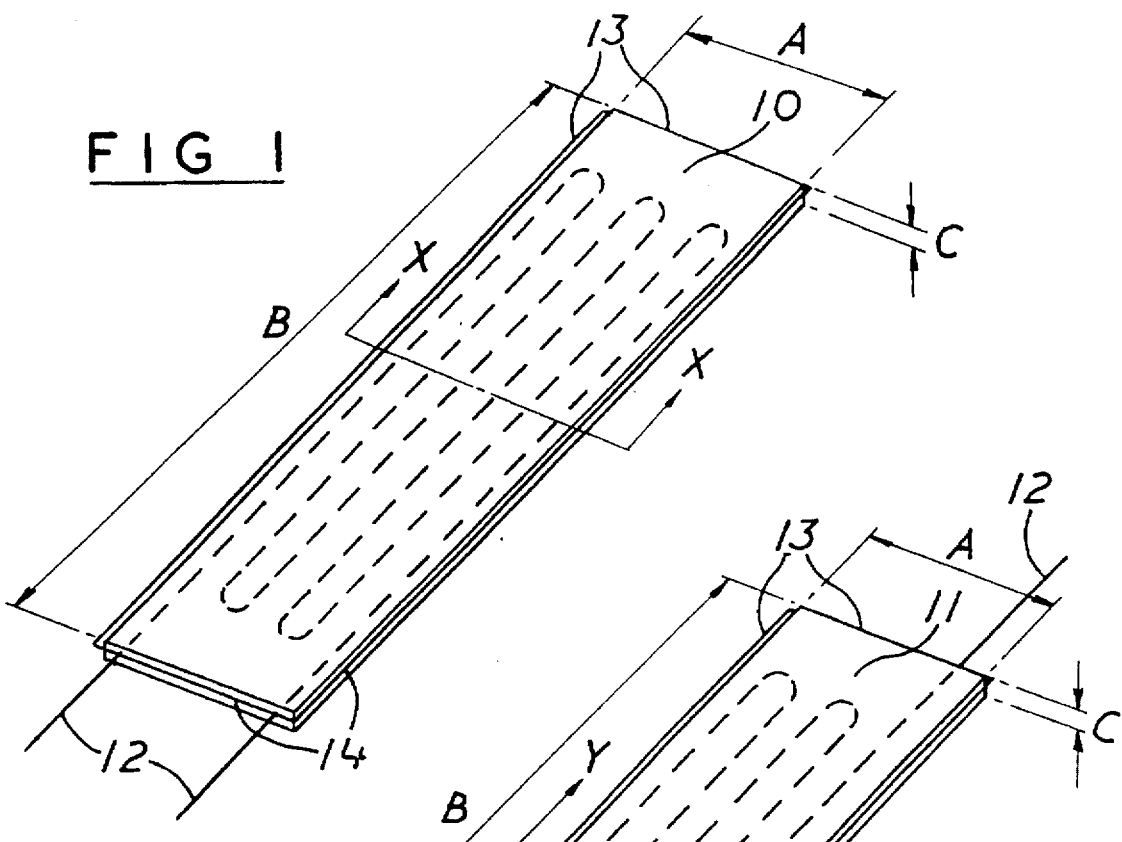
FIG. 1 is a perspective view of a first form of panel containing a serpentine heat exchange element.
Figure 2:
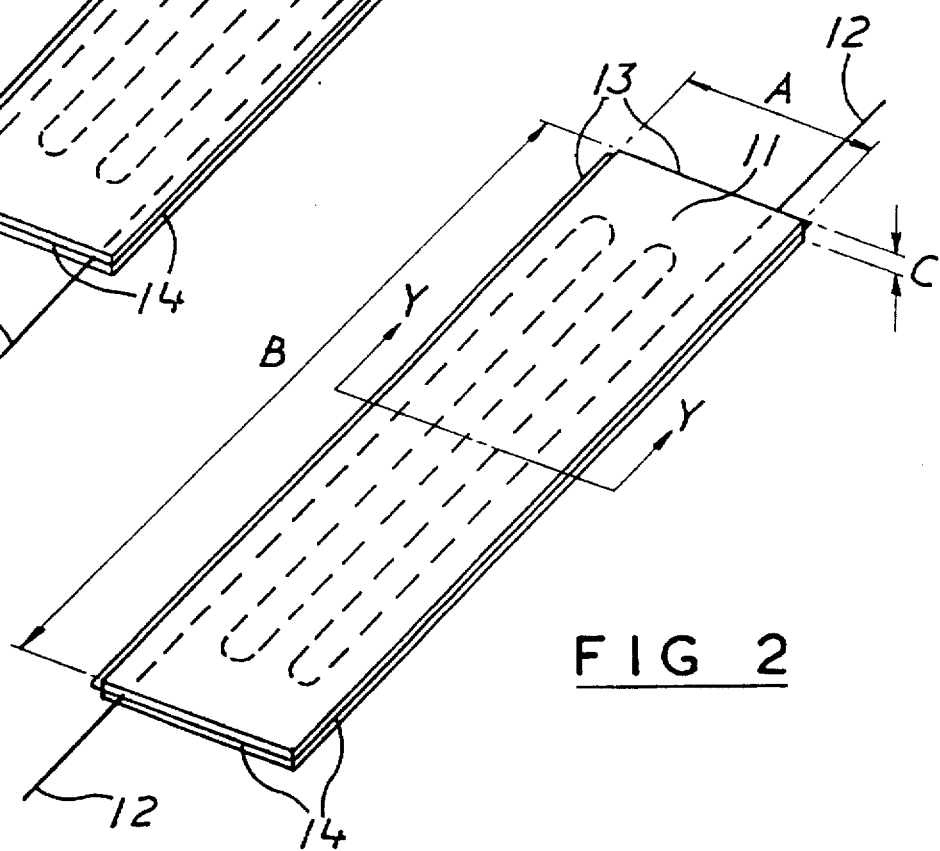
FIG. 2 is a perspective view of a second form of panel.
Figure 3:
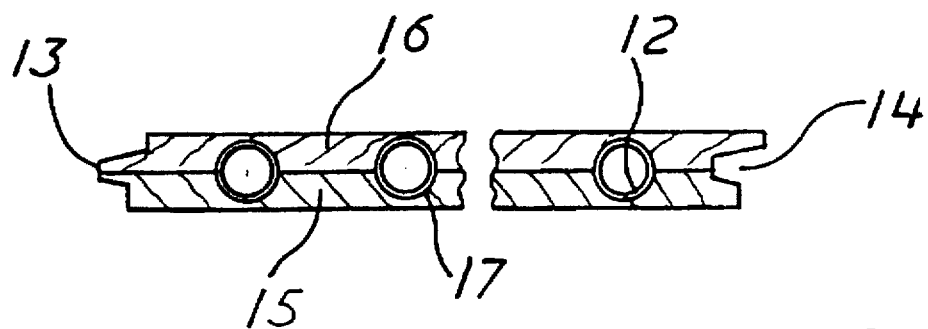
FIG. 3 is a sectional view along the line X—X of the panel shown in FIG. 1.

FIGS. 1 and 2 show different panel layouts and, although FIG. 3 is stated to be a sectional view of the panel 10 shown in FIG. 1, it could alternatively be a sectional view of the panel 11 shown in FIG. 2. Equally, FIG. 4 could be a sectional view of the panel 10 shown in FIG. 1.

The panels 10 and 11 shown in FIGS. 1 and 2 respectively have a width A, a length B and a thickness C, typically 600 mm., 2,400 mm. and 18 mm. Tubing or cabling 12 of serpentine configuration is embedded within each panel 10, 11. The embedded tubing or cabling 12 within panel 10 enters and leaves the panel at the same end, whereas the tubing or cabling 12 embedded within panel 11 enters at one end and leaves at the other. The tubing or cabling 12 within panel 10 includes five 180° bends, whereas that within panel 11 includes only four 180° bends.

The 180° bends are spaced inwardly from the ends of each panel 10, 11 so that sections are provided at each end of each panel 10, 11 which may be trimmed to aid fitting of the panels on site. As shown, the tubing or cabling 12 is located centrally between the two ends of each panel 10, 11. It however, preferred that, for a panel 10, i.e. one in which the tubing or cabling 12 enters and leaves the panel at the same end, the tubing or cabling 12 is located closer to that end so that the length of panel available for trimming purposes at the other end of the panel is thereby increased. The top surface of each panel 10, 11 is printed to show the layout of the tubing or cabling 12, with a warning to installers not to insert fixing screws through the line of the tubing or cabling 12.

Each panel 10, 11 is of a bonded particulate material or of some other solid material such as plywood. Each panel 10, 11 may, for example, be of chipboard or fibreboard or of wood shavings bonded together by a resin and is formed so that it can be installed with standard mass-produced wall or floor panels, such mass-produced panels typically having tongued and grooved edges to enable them to be assembled closely together. Each panel 10, 11 thus has similar tongues 13 along one end and one side and grooves 14 along the other end and other side.

Figure 1A:
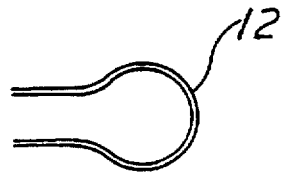
FIG. 1A is a detail view showing an alternative arrangement for the loops of the serpentine heat exchange element.

FIG. 1A shows an alternative method of forming the bends in the tubing or cabling 12. Each bend can then have a larger radius of curvature than is the case with the arrangement shown in FIGS. 1 and 2. Thus, if the straight portions of the tube or cabling 12 are disposed 100 mm. apart, the bends can be formed with a radius of curvature of 80 mm. This facilitates bending of tubes through which a heating or cooling fluid is to be passed.

FIG. 3, which is a cross-sectional view of the panel 10, shows one method of construction and the general form of the tongues 13 and the grooves 14. The panel 10 is produced from two thinner panels 15 and 16 each of which has been machined or otherwise formed with a serpentine channel 17, the channel 17 in one thinner panel being the mirror image of the channel 17 in the other thinner panel. The tubing or electric cabling 12 is introduced into one of the channels 17 and then the two thinner panels 15 and 16 are glued or otherwise fixed together so as to embed the tubing or cabling 12 within the structure of the formed panel 10.

It is important that the machining or forming of the channels 17 is accurate to suit the external diameter of the tubing or electric cabling 12 to ensure that there is good thermal contact between the outside of the tubing or cabling 12 and the inside of each channel 17. For this reason, it is recommended that, if the heating/cooling tubing or electrical cabling is circular in section, the base of each of the channels 17 should be semi-circular in section.

Figure 4:
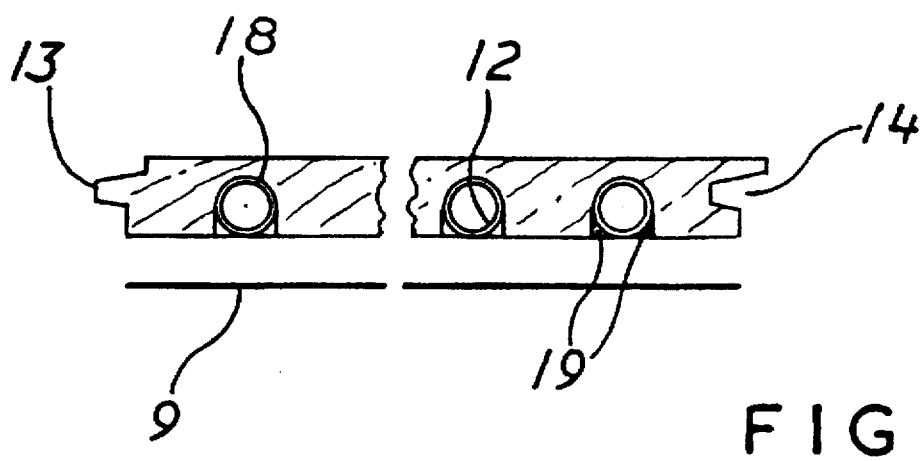
FIG. 4 is a sectional view along the line Y—Y of the panel shown in FIG. 2.

FIG. 4, which is a cross-sectional view of the panel 11, shows another method of construction, in which a full-thickness panel has been machined or formed from one face to create a serpentine channel 18 into which the tubing or electric cabling 12 has been pressed. It is again important that the machining of the channel 18 is accurate to suit the external diameter of the tubing or electric cabling 12, to ensure that there is good thermal contact between the outside of the tubing or cabling 12 and the inside of the channel 18. For this reason, it is recommended that the channel 18 should be machined or otherwise formed with a bottom profile which is appropriate to the section of the tubing or cabling 12. With this method of construction, the machined or formed depth of the channel 18 needs to be approximately equal to the external diameter of the tubing or cabling 12. Optionally, the tubing or cabling 12 may be covered with a protective or conductive cement/plaster filling 19.

After the tubing or cabling 12 has been located in the channel 18 and the optional filling 19 has been applied if required, a thin sheet 9 of aluminium foil can be bonded to the underside of the panel 11 so as to cover substantially the whole of the panel 11. The sheet 9 of foil will contact the tubing or cabling 12 and/or the filling 19 and will avoid direct contact of the atmosphere with the tubing or cabling 12 and/or the filling 19. The sheet 9 of aluminium foil will act as a thermal reflector, rather than as a radiator, so as to ensure that the proportion of the heat generated within the tubing or cabling 12 which is radiated from the upper surface of the panel 11 is greater than would otherwise be the case.

Thus, a sheet of aluminium foil (not shown) could also be bonded to the underside of the panel 10 shown in FIGS. 1 and 3 to increase the performance of the upper surface of the panel 10 as a thermal radiator. The use of a sheet of aluminium foil over the underside of a panel 10, 11 will also serve to improve the fire-resistance characteristics of the panel 10, 11.

Figure 5:
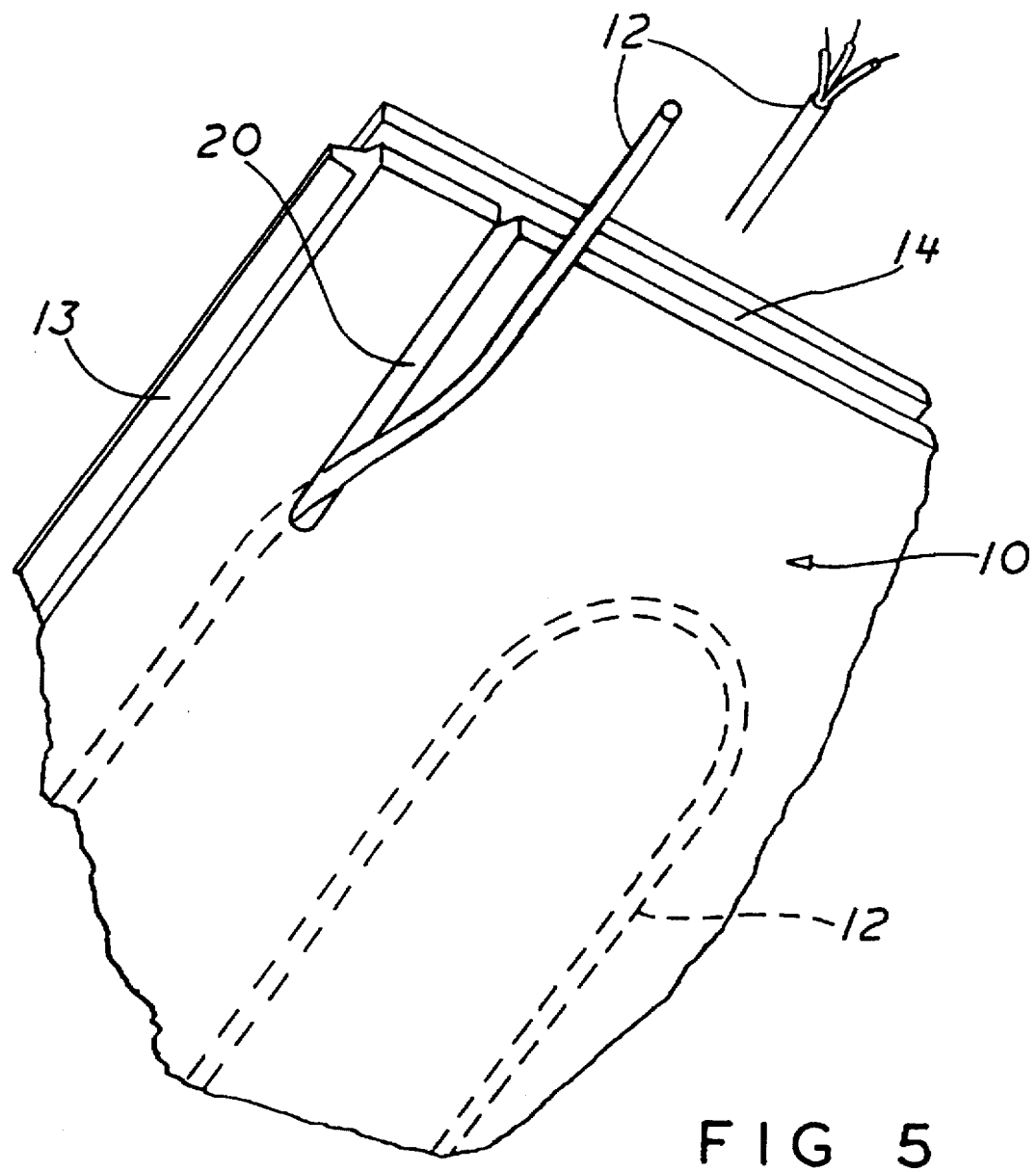
FIG. 5 is an underneath perspective view of a corner of the panel shown in section in FIG. 3.

Turning next to FIG. 5, this shows a corner of the panel 10 and the provision of a rebate 20 which is machined or formed in the underside of the panel 10 at the point at which the embedded tubing or electric cabling 12 enters or leaves the panel 10. The rebate 20 comprises a slot which is slightly wider than the external diameter of the embedded tubing or cabling 12 and has a length to suit the characteristics of the tubing or cabling 12 such as to permit the end of the tubing or cabling 12 to be positioned without undue strain in the tubing or cabling 12 a distance below the underside of the panel 10 approximately equal to the thickness of the panel 10. This enables connection of the tubing or cabling 12 to the tubing or cabling of other panels or to flow and return supply pipes or to a power supply feed, as described in more detail below.

Figure 6:
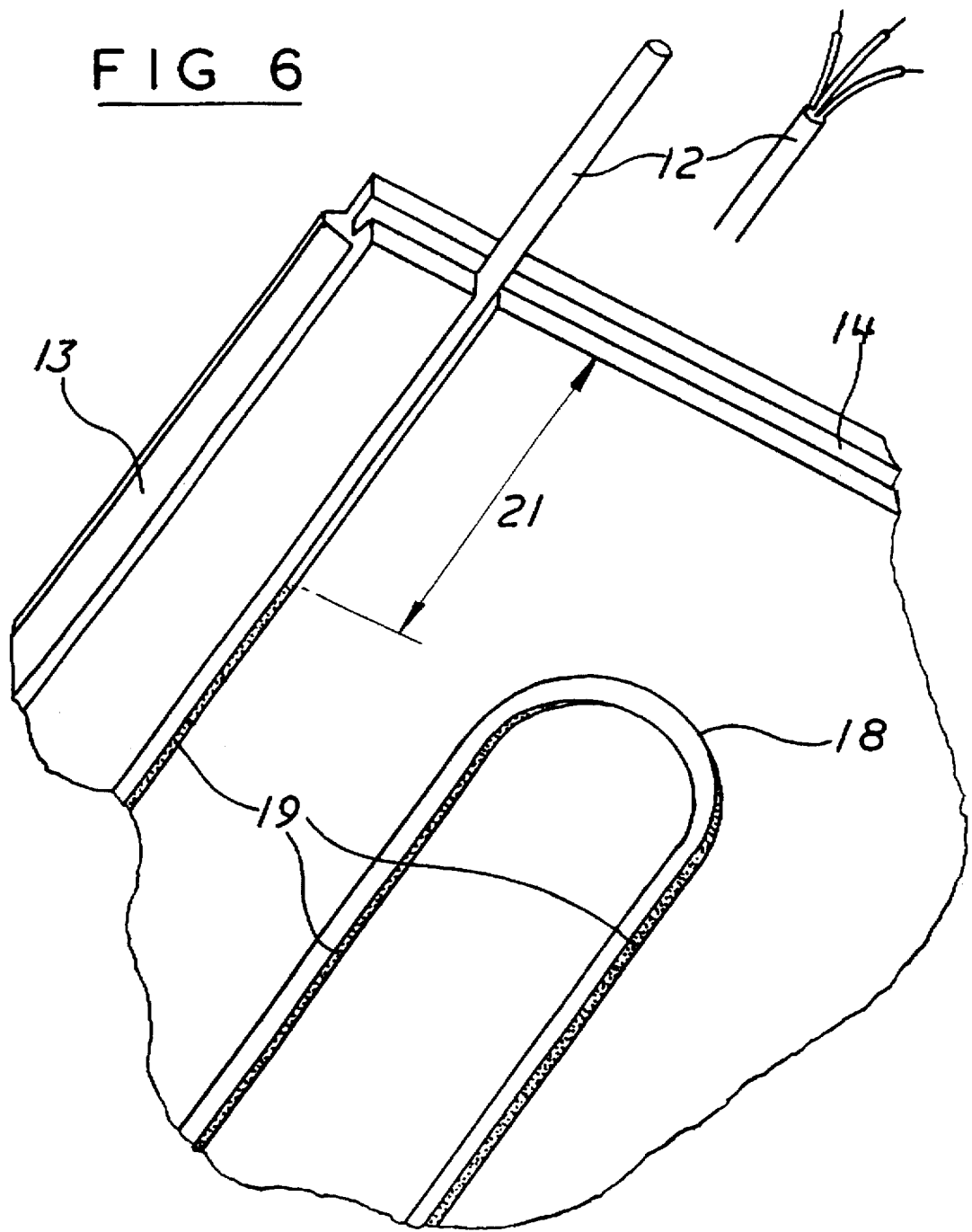
FIG. 6 is an underneath perspective view of a corner of the panel shown in section in FIG. 4.

As shown in FIG. 6, no rebate as such is required for the panel 11, since the method of construction of the panel 11 (as illustrated in FIG. 4) is such that the tubing or electric cabling 12 is pressed into a full-length machined or formed channel 18 and, to effect connections to the tubing or electric cabling 12, the tubing or electric cabling merely has to be pulled out of the channel 18 for a short distance back from the edge of the panel 11. However, if the tubing or electric cabling 12 has been further located by the optional filling 19, care must be taken to ensure that no such filling is used for the end portion 21 of the channel 18.

Figure 7:
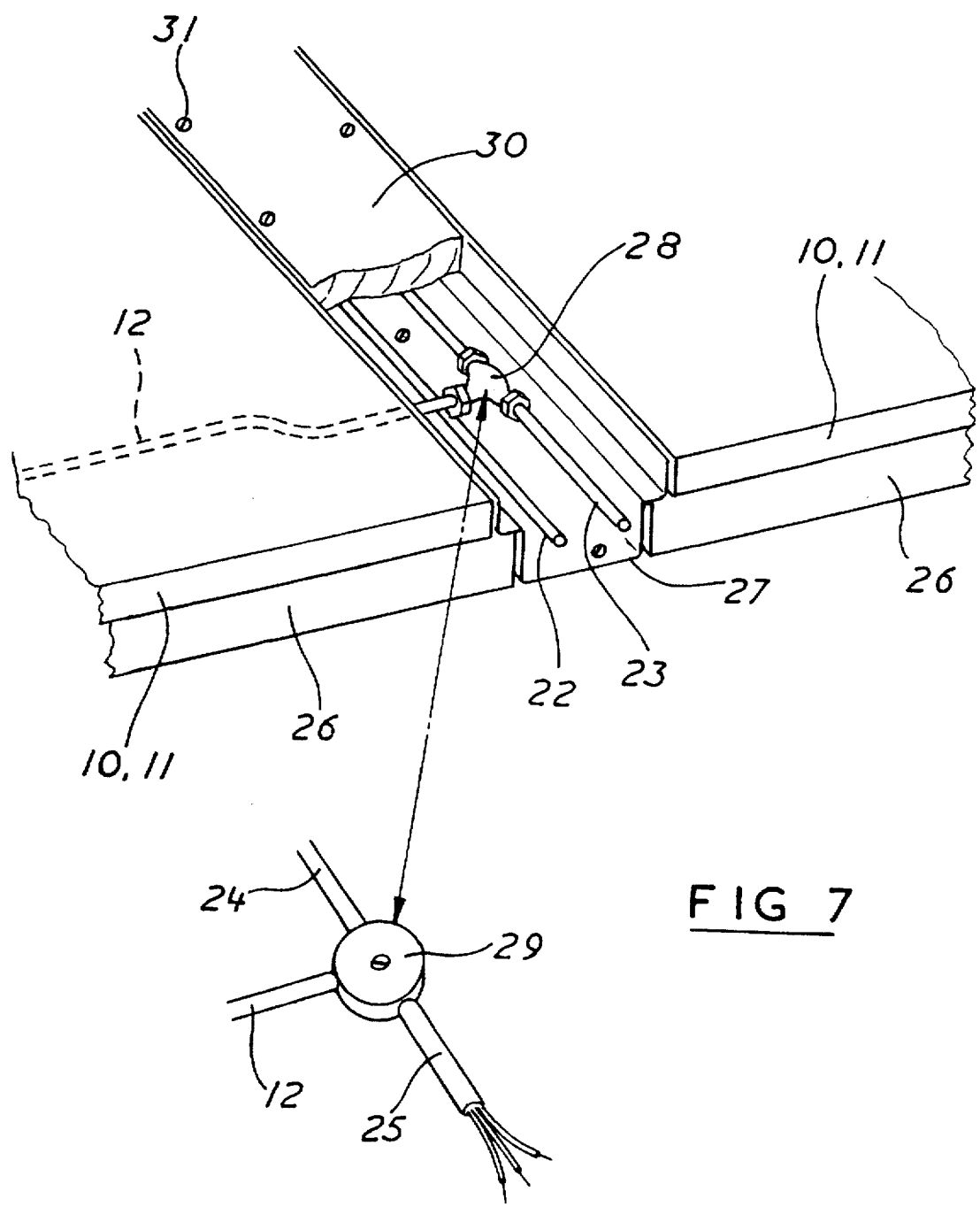
FIG. 7 shows the provision of a conduit between two adjacent panels, with supply and return pipes or a power supply cable located in the conduit.

FIG. 7 shows how connections are made between the tubing or electric cabling 12 embedded within a panel 10, 11 and flow and return supply pipes 22 and 23 (or power supply cables 24 and 25). A pair of panels 10 or 11 are placed on a layer of insulation material 26 laid on top of a firm base (not shown), for example, a concrete base. The panels 10 or 11 are positioned one on each side of a proprietary conduit 27 which is used to bring the flow and return pipes 22 and 23 or the power supply cables 24 and 25 to a position adjacent an end of a panel 10 or 11.

An aperture is made within the walling of the conduit 27 adjacent to where the tubing or cabling 12 enters or leaves the end of the panel 10 or 11. The end of the tubing or cabling 12 is then eased out of either the rebate 20 or the end portion 21 of the channel 18 and positioned within the conduit 27 via this aperture. The tubing or cabling 12 is then connected by means of a tube coupling 28 to the appropriate pipe 19 or 20 or by means of an electrical connector 29 to the power supply cables 24 and 25. The conduit 27 is then fitted with its proprietary capping 30, for example, a plywood capping held in position by fixing screws 31.

Figure 8:
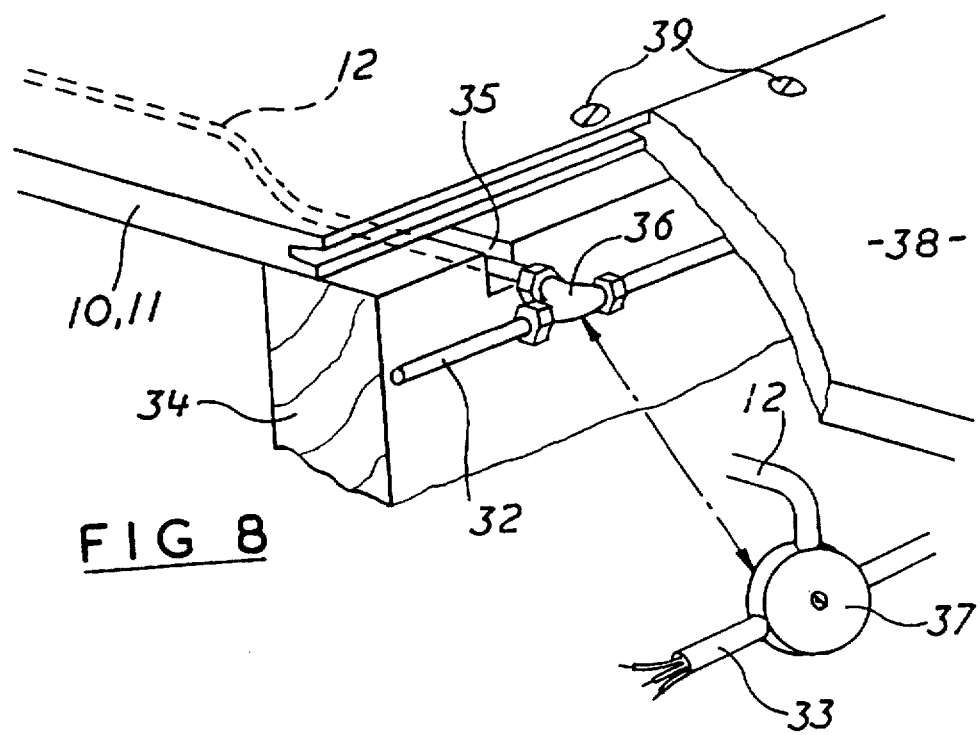
FIG. 8 shows the connection of a heat exchange element to a supply or return pipe or to a power supply cable when a panel is laid on top of a joist.

FIG. 8 shows how connections are made between the tubing or electric cabling 12 embedded within a panel 10, 11 and a flow or return supply pipe 32 or a power supply cable 33, when the panels 10, 11 are installed on top of timber joists or battens 34.

When installing floor or wall panels, it is customary to position the joints between the ends of adjacent panels so that they coincide with the top of a joist or batten 34. A slot 35 having a width slightly greater than the external diameter of the tubing or electric cabling 12 is cut into the top of the joist or batten 34 adjacent to the position at which the tubing or electric cabling 12 enters or leaves the end of the panel 10 or 11. A pipe coupling 36 or an electric connector 37 is located adjacent the joist or batten 34 and the depth of the slot 35 is such as to suit the dimensions of the coupling 36 or connector 37. The end of the tubing or electric cabling 12 is then eased out of the body of the panel 10, 11, this being facilitated by the arrangements shown in FIGS. 5 and 6. The tubing or electric cabling 12 is then connected to the flow or return pipe 32 or to the power supply cable 33 using the coupling 36 or the connector 37.

Wherever possible, it is preferred that a plain, industry-standard panel 38 is positioned above the couplings 36 or connectors 37 and fitted in such a way that it is removable, in order that access can be obtained to the couplings 36 and connectors 37. The ends of the panels 10, 11 and 38 can then be fixed to the joists or battens 34 using screws 39 again taking care to ensure that the screws 39 are so positioned as to avoid damaging the tubing or cabling 12.

Figure 9:
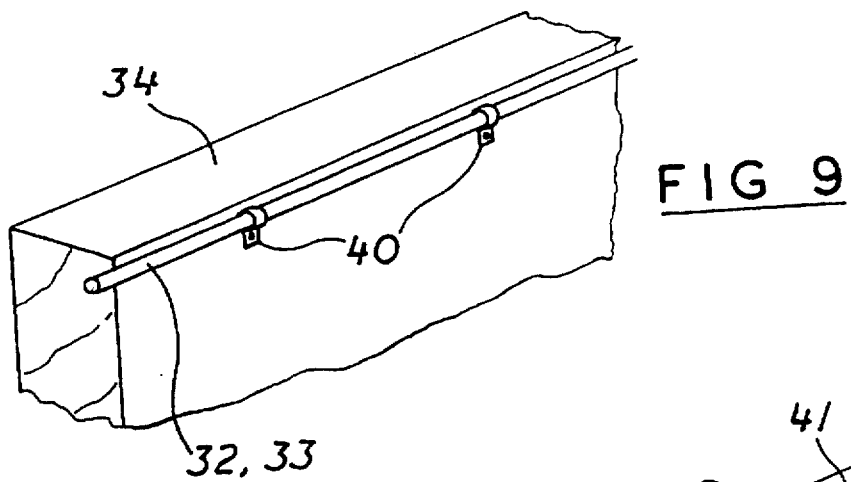
FIG. 9 is a detail view showing a pipe or cable extending alongside a joist.
Figure 10:
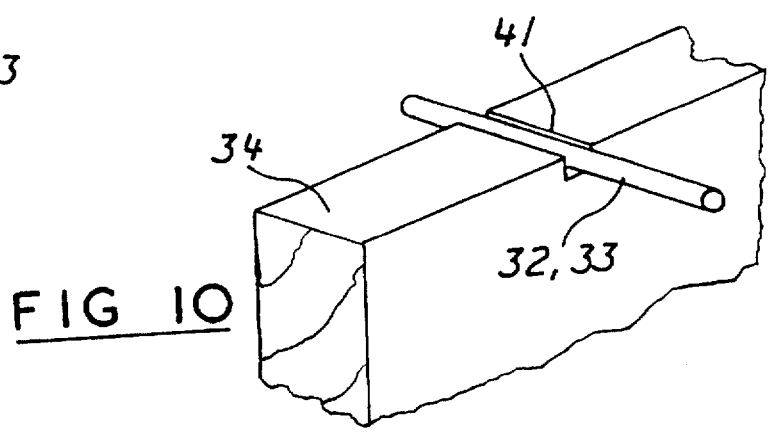
FIG. 10 is a detail view showing a pipe or cable extending at right angles to a joist.

If the flow or return pipes 32 or the electric supply cables 33 must be run below the floor to locations adjacent to the ends of panels 10 or 11, where they must run in the direction of the line of the joists 34, it is recommended that they be clipped to the tops of the joists 34 using proprietary P-clips 40 in the manner shown in FIG. 9. Where the pipes 32 or cables 33 must run across the line of the joists 34, it is recommended that they be located in slots 41 cut neatly into the tops of the joists 34 in the manner shown in FIG. 10.

In an alternative arrangement, a hole is drilled on the neutral axis of the joist and the pipe or cable is passed through this drilled hole.

Figure 11:
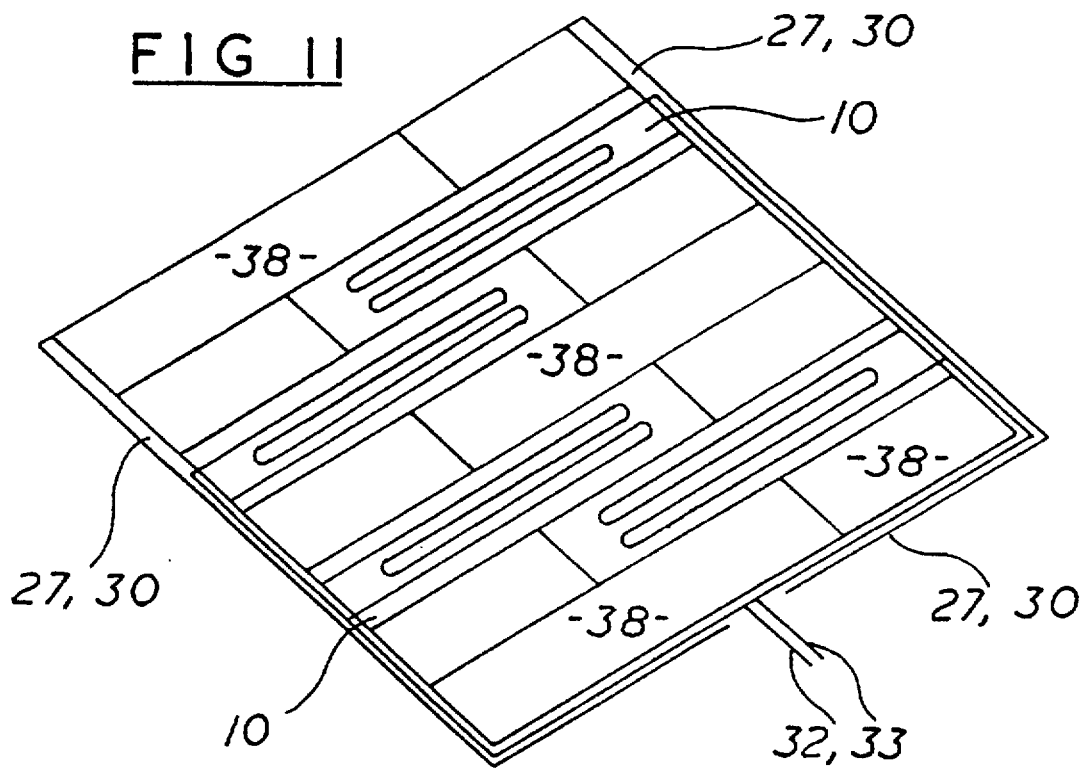
FIG. 11 shows a typical floor panel installation.
Figure 12:
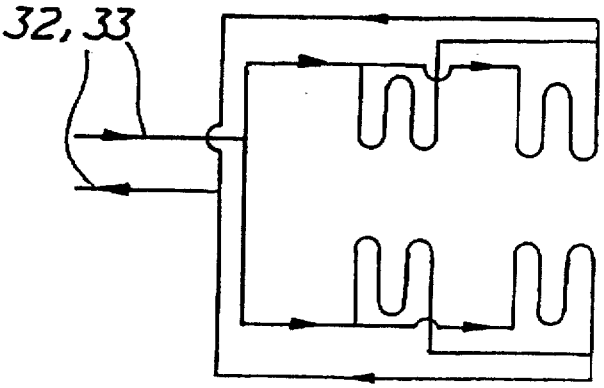
FIG. 12 shows the connection of the panel modules of the installation of FIG. 11 to the supply.

FIG. 11 shows a typical floor installation which includes four panels 10 and ten plain, industry-standard panels 38 laid on top of a layer of insulation (not shown). The heat exchange elements within the panels 10 are arranged in parallel as shown in FIG. 12 and are connected to the supply and return pipes 32 or to the power supply cables 33 in the manner illustrated in FIG. 7. Conduits 27 with their associated capping members 30 are used along three sides of the installation as shown in FIG. 11.

The sequence of installation is as follows:

a) the conduits 27 are positioned on the three sides of the installation and are fixed to the floor, for example, a concrete base, b) if the panels 10 and 38 do not include a layer of insulation, an insulation layer is then laid, and c) the panels 10 and 38 are then laid in the configuration shown in the sequence determined by the tongue and groove formations on the panels.

Whenever a panel 10 is laid, apertures are made in the walling of the adjacent conduit 27 near the points at which the tubing or electric cabling 12 enters or leaves the panel 10 and the tubing or electric cabling is fed through such apertures into the conduit 27. When all the panels 10 and 38 are in position, the flow and return supply pipes 32 or the electrical supply cables 33 are run into the conduits 27 to points adjacent to the ends of the panels 10 and connections made as described above. When such connections have been made and tested, the capping members 30 for the conduits 27 are screwed into position.

The number of panels 10 required for a given floor can be determined from a consideration of the size and usage of the floor and the space above it. The arrangement shown in FIG. 11 is, however, that of a typical installation. FIG. 12 shows how the heat exchange elements within the panels 10 are linked in parallel so that each has the same relationship to the flow and return supply.

Figure 13:
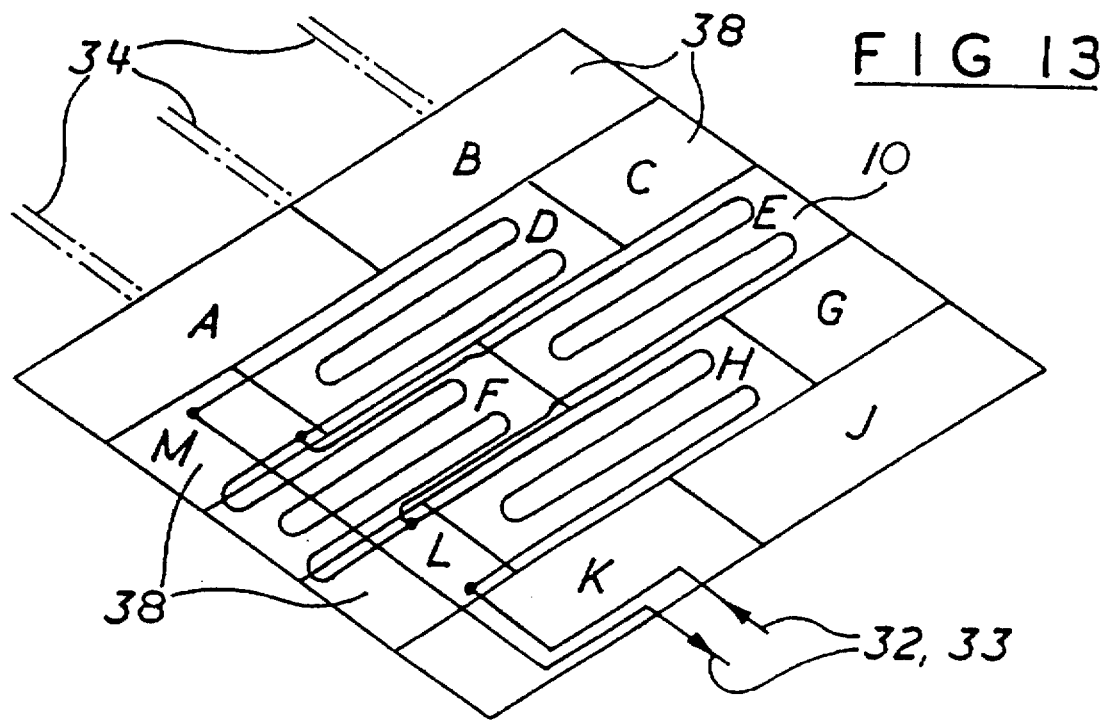
FIG. 13 shows another typical floor panel installation.

Turning next to FIG. 13, this shows a typical installation comprising four panels 10 and eight plain, industry-standard panels or boards 38. The method of interconnection of the heat exchange elements within the panels 10 and the flow and return supply pipes 32 or the electrical cabling 33 is as shown in FIG. 8. The positions of the timber joists 34 are indicated in FIG. 13 and it is to be noted that the junctions between the ends of the panels 10 and 38 coincide with the tops of the joists 34.

Figure 14:
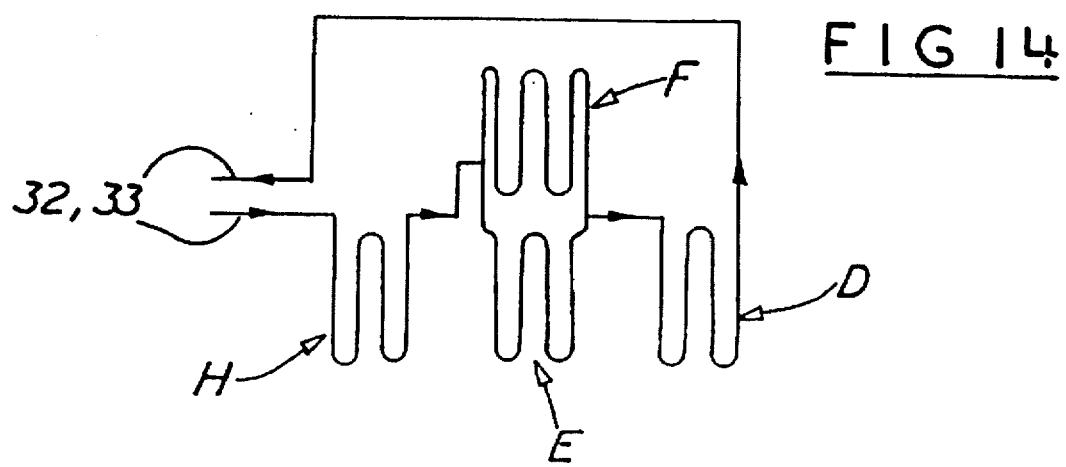
FIG. 14 shows the connection of the panel modules of the installation of FIG. 13 to the supply.

The boards or panels 10 and 38 are indicated in FIG. 13 by the letters A, B, C, D, E, F, G, H, J, K, L and M. Panels D, E, F and H are in the form of modules which incorporate serpentine heat exchange elements as described above, whilst the other panels are industry-standard floor panels. The boards or panels are positioned together to form part of the floor structure within which the modules are interlinked with a flow diagram for the heat exchange elements as shown in FIG. 14.

The sequence of installation is as follows:

a) Boards A and B are laid first, followed by boards C and D, the latter being the first of the boards containing a heating element.

b) Board E is next, taking care to position the tubing or electric cabling of that board across and along the joists 34 to below where the boards L and M will be located.

c) Board F is next, again taking care to position the tubing or electric cabling from that board into the spaces below boards L and M.

d) Boards H and G will be next, followed by board J.

e) At this stage, the flow and return pipes 32 or the electrical power supply cables 33 can be laid and the connections made to the tubing or cabling in boards D, E, F and H. The connections are then tested.

f) Board K is then fitted, followed by boards L and M which are fitted in such a way that they are removable.

The number of boards or panels which need to incorporate heat exchange elements can be determined from a consideration of the size and usage of the floor and the space above it. The overall energy efficiency can be improved if some form of insulation is introduced between the joists 34 before the boards or panels are laid and if those boards or panels which incorporate a heat exchange element are lined on their undersides with a sheet of aluminium foil, as explained above in relation to FIG. 4.

Figure 15:
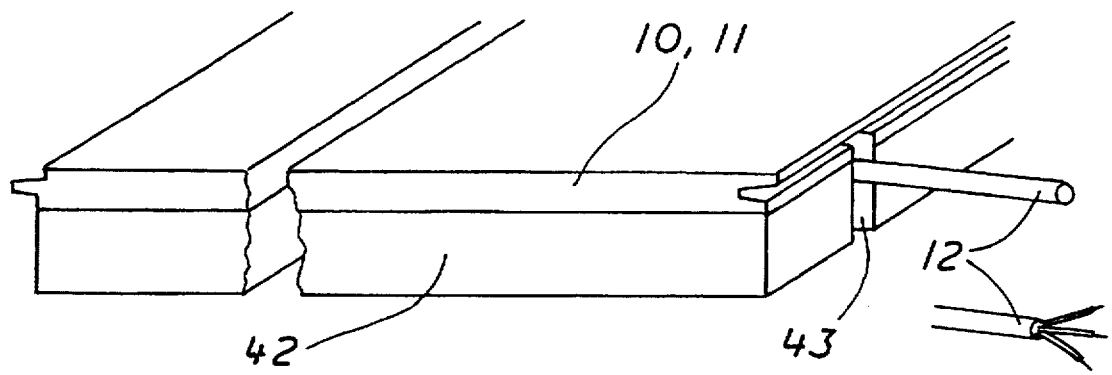
FIG. 15 shows a first form of composite board.

FIG. 15 shows how a panel 10, 11 in accordance with the invention can form part of a composite board. The board 10, 11 is bonded to a layer of insulation material 42. With such a composite board, it is necessary to form not only a rebate in the underside of the panel 10, 11 but also a rebate 43 in the layer of insulation material 42 so as to facilitate connection of the embedded tubing or electric cabling 12 to the flow and return supply pipes or to the electricity supply.

Figure 16:
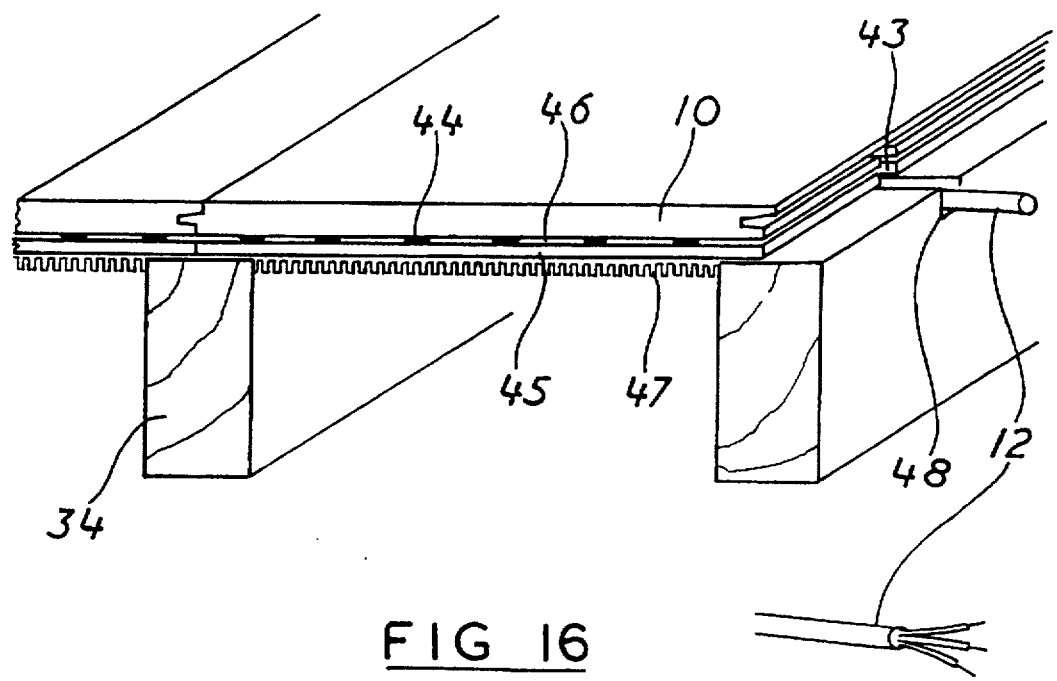
FIG. 16 shows the installation of a second form of composite board, designed to have acoustic properties.

A further form of composite board is shown in FIG. 16 and is designed for use where its acoustic properties are important. Such acoustic boards are increasingly specified for multiple-occupation buildings. As shown, a panel 10 is bonded by adhesive discs 44 to a secondary board 45 in such a way that an air gap 46 is created between the underside of the panel 10 and the secondary board 45. This air gap 46 inhibits the transmission of noise from above the panel 10 to the joists 34. Such a composite board can have another layer 47, of felt-like material bonded to its underside.

The composite board of FIG. 16 will be formed with a rebate 43 not only in the underside of the panel 10 but also in the secondary board 45 and in the layer 47 of felt-like material. FIG. 16 also shows how the timber floor joist has to be notched at 48 to enable connections to be made to the embedded tubing or electric cabling 12. As explained above in relation to FIG. 10, a hole could alternatively be drilled on the neutral axis of the joist to receive the tubing or cabling 12.

With underfloor heating systems which have hitherto been available, it has been quite impossible to install them in conjunction with acoustic boards such as that illustrated, because the air gap which forms part of the acoustic board has inhibited the conduction of heat through to the floor surface. However, with the panel of the present invention, it becomes possible to manufacture an acoustic board with integral underfloor heating/cooling. Moreover the presence of such an air gap helps prevent loss of heat through to the underside of the composite board.

Figure 17:
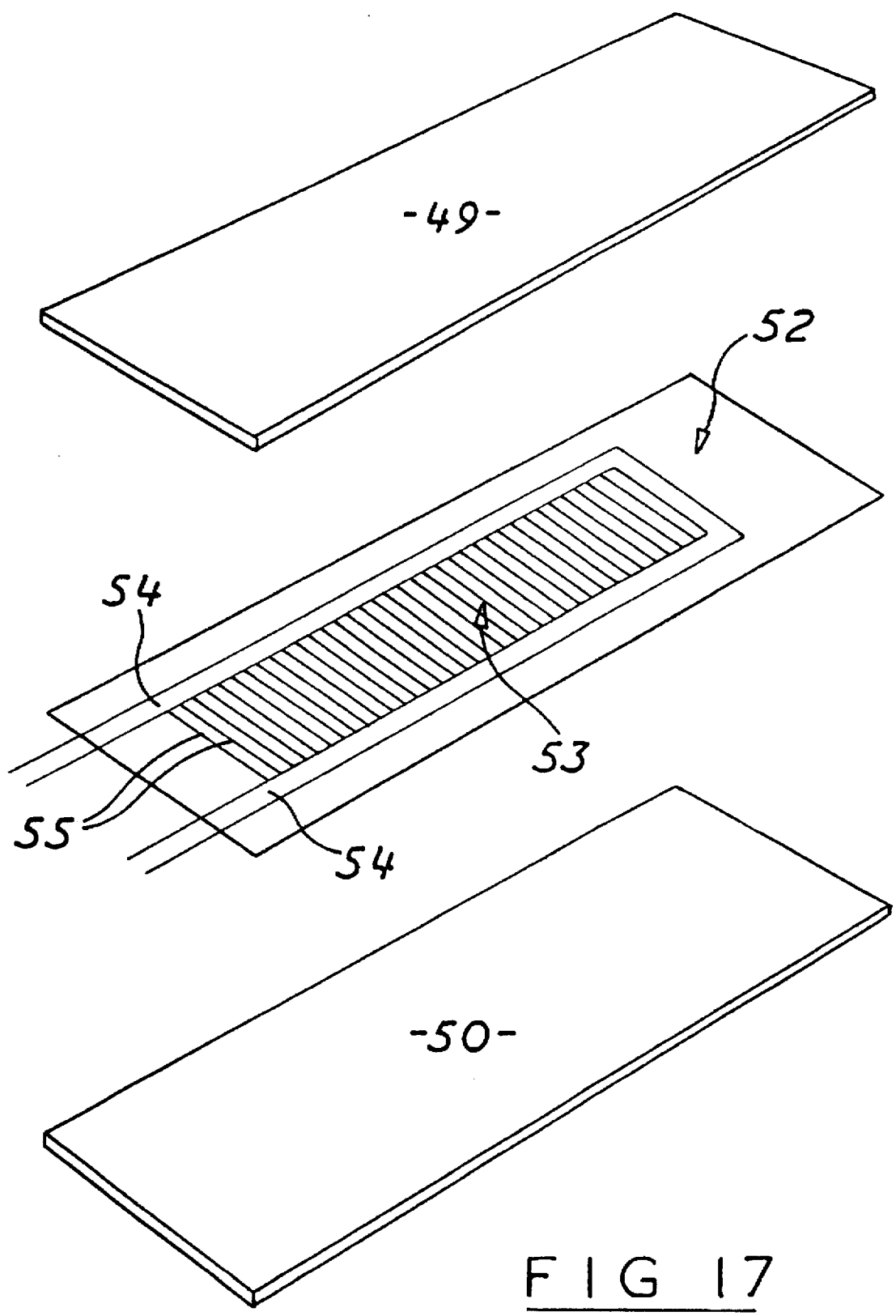
FIG. 17 is an exploded view of a further form of panel in accordance with the invention.

A further method of producing a panel is shown in FIG. 17. This involves the use of two half-thickness panels 49 and 50 of fibreboard, chipboard or the like between which a plastic sheet 52 is sandwiched. The sheet 52 has a resistance element 53 printed on it or otherwise applied to it and the resistance element 53 includes a pair of parallel relatively thick end members 54 between which there extend a large number of relatively thin lines 55 of higher resistance than the end members 54. The panel of FIG. 17 is produced by bonding the three layers together with, optionally, a thin sheet of aluminium foil (not shown) on the underside of the panel so as to act as a reflector, as described above in relation to FIG. 4. In use, the resistance element 53 will be connected to the power supply and the arrangement of the thin lines 55 will be such that the panel is heated substantially uniformly throughout its area. As there are a large number of thin lines 55 disposed in parallel, the effectiveness of the resistance element 53 will be affected only marginally if one or two of such lines should become ruptured.

In a further method of producing a panel, not shown in the drawings, an arrangement similar to that shown in FIG. 17 is employed except that, instead of an electrical resistance element, an assembly of plastic tubes is employed, said assembly comprising a pair of end members having an internal diameter of the order of 7 mm, with a large number of narrow, almost capillary-like tubes interconnecting the end members, the narrow tubes having an internal diameter of 1 or 2 mm.

The present invention has a number of advantages, as follows:

a) the use of the panels or boards of the present invention in conjunction with standard, mass-produced boards which would be used anyway, results in the heating/cooling system for a building being incorporated automatically as part of the construction or refurbishment programme. It does not have to be added as a separate activity.

b) the heating/cooling system which is created has all of the advantages associated with underfloor heating/cooling systems, for example, high comfort levels without draughts, high energy efficiency, uncluttered walls, reduced decoration costs and higher relative humidity, thus providing less dryness. Thus, although it might have been expected from experience of present underfloor heating systems that the separation of such small diameter tubing, i.e. tubing of from 5 to 9 mm. internal diameter, so widely in a known poor conductor, such as chipboard or fibreboard, would result in the heating/cooling effect being localised to the immediate vicinity of the tubing, with the consequence that the panel would not radiate. Contrary to such expectations, it has been found that, provided good physical contact is established between the tubing and the body of the panel, not only is thermal conduction sufficiently good to induce the panel to radiate, but that the required top surface temperature for heating comfort to be achieved can be obtained with water temperatures lower than those used in present underfloor heating systems.

c) the use of the panels or boards and the method of the present invention substantially reduces the cost of installing underfloor heating/cooling systems, which has been a principal factor inhibiting their wide-scale use. Thus, the cost of supplying and laying a layer of insulation on top of which panels are laid in a manner such as is illustrated in FIG. 11 or FIG. 13 will be comparable to the combined cost of laying a solid screeded floor and installing a conventional convection heating system. In addition, for timber floors laid on joists, the combined cost of supplying and laying a complete floor of "industry-standard" panels and supplying a conventional convection heating system will be greater than the cost of supplying and installing the same floor provided with underfloor heating in a manner such as is illustrated in FIG. 11 or FIG. 13.

Whereas convection systems which use radiators require water heated to a temperature of approximately 80° C., the currently available underfloor heating systems provide complete comfort with floor temperatures of between 23° and 25° C. and this can be achieved using water at a temperature of 60° C. This is much lower than for radiator systems and is the principal reason why the current underfloor heating systems show fuel savings, as compared with equivalent radiator systems, of between 40 and 50%.

In contrast with this, when using the panels of the present invention which incorporate small-diameter tubing through which hot water is pumped, the required floor surface temperature can be achieved with water temperatures as low as 45° to 50° C. When the much lower water volumes, as compared with radiator systems or underfloor heating systems using large diameter pipes, are also taken into account, it can be seen that a heating system in accordance with the present invention is very much more economical than radiator systems and significantly more energy-efficient than existing underfloor heating systems.

The panels of the present invention are almost identical in form and dimension to "industry-standard" floor and wall panels. They are as easy to install as "industry-standard" floor and wall panels and can be connected into a heating system more easily than radiators. They can also be used as a cooling system in, for example, an office block. If water from a source of chilled water is fed through the tubing within panels forming part of either a wall or floor, the cooling effect obtained in this way will maintain office premises at a comfortable working temperature, even during a heat wave.

The panels of the present invention can also be used as components of more sophisticated flooring panels, as explained above with particular reference to FIGS. 15 and 16.

The heating system of the present invention also produces a heating effect very quickly. With most forms of heating system, there is a time-lag between turning on the heating and the production of a noticeable heating effect. With large diameter piping underfloor heating systems, this delay is such that most such installations have to be run almost continuously.

A panel in accordance with the present invention has very little thermal inertia and it is an effective radiator. Consequently, the panel starts to produce a heating effect within approximately ten to fifteen minutes of start-up and, equally importantly, begins to cool within a similar period after shut-down. The importance of this is that there is little investment in energy left behind after shut-down, which is not the case with most other forms of heating system. Thus, as applied to, for example, a heating system for an office block, the heating system can be turned on shortly before the start of the working day and then turned off at the end of the working day without excessive heat losses.

I claim:

1. A method of installing a heating/cooling system which includes:

a) providing a plurality of solid panels each of which comprises a solid body having an upper surface and a lower surface some of the panels being in the form of heating/cooling modules each of which incorporates a heat exchange element of serpentine form disposed within a downwardly facing serpentine channel in the body of the panel so as to be spaced from the upper surface of the panel and located in thermal contact with the body of the panel, while others of said panels do not contain a heat exchange element, b) the panels containing heat exchange elements being of the same size and external configuration ad those not containing heat exchange elements, c) joining said panels together to form a structure, and d) interlinking the heat exchange elements of said modules, and in which:

i) each serpentine channel is formed in the undersurface of the respective panel, ii) the undersurface of each panel which incorporates a heating element is covered by a sheet of reflective metal foil, and iii) the upper surface of each panel which incorporates a heating element is marked to indicate the location of the heating element.

2. A method of installing a heating/cooling system which includes;

a) providing a plurality of solid panels each of which comprises a solid body having an upper surface and a lower surface, some of the panels being in the form of heating/cooling modules each of which incorporates a heat exchange element of serpentine form disposed within a downwardly facing serpentine channel in the body of the panel so as to be spaced from the upper surface of the panel and located in thermal contact with the body of the panel, while others of said panels do not contain a heat exchange element, b) the panels cooling heat exchange elements being of the same size and external configuration as those not containing heat exchange elements, c) joining said panels together to form a structure, and d) interlinking the heat exchange elements of said modules, and in which the heat exchange elements comprise plastic tubing through which a heating/cooling medium is passed, the panels are said on joists to form a floor, the elements are connected to supply and return pipes located between the joists and the connections to said supply and return pipes are effected beneath panels which do not incorporate heat exchange elements.

3. A central heating/cooling system comprising at least one source of heating/cooling fluid with flow and return pipes and heat exchange mean, wherein the heat exchange means comprises at least two heat exchange elements each incorporated within a solid panel having an upper surface add a lower surface and forming part of a floor of cooperating panels, said floor also including a plurality of panels which do not contain heat exchange elements, the panels which incorporate heat exchange elements being of the same size and configuration as those which do not incorporate heat exchange elements, each of the heat exchange elements being of serpentine form and located as a close fit in a downwardly facing channel in the panel so as to be spaced from the upper surface of the panel means being provided for connecting the heat exchange elements to each other and to the source, and in which:

a) the panels are formed of bonded particulate material, b) the panels which incorporate heat exchange elements each have their lower surfaces covered by a sheet of reflective metal foil, and c) the panels which incorporate heat exchange elements have their upper surfaces marked to indicate the locations of the heat exchange elements.

* * * * *